United States Patent
Freudiger

(10) Patent No.: US 8,070,877 B2
(45) Date of Patent: Dec. 6, 2011

(54) METHOD FOR THE PRODUCTION OF A PLANT-BASED CONSTRUCTION MATERIAL AND CONSTRUCTION MATERIAL OBTAINED BY MEANS OF SAID METHOD

(75) Inventor: Martin Freudiger, Gals (CH)

(73) Assignee: Nawaro AG (CH)

( * ) Notice: Subject to any disclaimer, the term of this patent is extended or adjusted under 35 U.S.C. 154(b) by 1827 days.

(21) Appl. No.: 10/532,957

(22) PCT Filed: Oct. 28, 2002

(86) PCT No.: PCT/CH02/00583
§ 371 (c)(1),
(2), (4) Date: Apr. 27, 2005

(87) PCT Pub. No.: WO2004/037742
PCT Pub. Date: May 6, 2004

(65) Prior Publication Data
US 2006/0165966 A1    Jul. 27, 2006

(51) Int. Cl.
*C04B 14/26* (2006.01)
*C04B 14/28* (2006.01)
(52) U.S. Cl. .................. 106/713; 106/644; 252/62
(58) Field of Classification Search ........ 106/644, 106/713; 252/62
See application file for complete search history.

(56) References Cited

U.S. PATENT DOCUMENTS 5,194,087 A * 3/1993 Berg ............... 106/18.12
(Continued)

FOREIGN PATENT DOCUMENTS
CH      688 721      1/1998
(Continued)

OTHER PUBLICATIONS

English translation of International Preliminary Examination Report dated Feb. 8, 2005, from corresponding PCT/CH02/00583 (6 pages).
(Continued)

*Primary Examiner* — Paul Marcantoni
(74) *Attorney, Agent, or Firm* — Ostrolenk Faber LLP

(57) ABSTRACT

The construction material on a plant basis PB (preferably miscantus) contains a binder and a mineralizer composed of a defined mixture M2 of calcium carbonate $CaCO_3$ and magnesium carbonate $MgCO_3$ that is prepared in an application-oriented manner, thereby resulting in a substantial improvement of its chemical, physical, and mechanical properties. The weight proportions of the components constituting said mixture M2 are comprised between approx. 60% and approx. 95%, preferably between 2/3 and 9/10, for the $CaCO_3$, and between approx. 5% and approx. 40%, preferably between 1/10 and 1/3, for the $MgCO_3$. The method for producing said construction material is rationalized by previously admixing the mineralizer to the binder, preferably Portland cement of strength class 52.5, directly at the binder plant according to determined specifications to obtain a mixture M1. The weight proportions of the components constituting the mixture M1 are comprised between approx. 50% and approx. 90%, preferably between 6/10 and 4/5, for the binder, and between approx. 10% and approx. 50%, preferably between 1/5 and 4/10, for the mineralizer. In order to improve the solidification process, a fungicidal preparation is added to the mixing water. A universal construction material allowing innumerable applications can be produced from the aggregate {PB+M1}. The range of applications is further enlarged by adding another application-oriented mixture M3 to said aggregate in defined proportions (e.g. gypsum for producing quick-assembly structural panels) or a flow agent in order to allow an extrusion method (e.g. for producing bar-shaped elements)).

23 Claims, 3 Drawing Sheets

U.S. PATENT DOCUMENTS

| | | | |
|---|---|---|---|
| 6,200,381 B1 * | 3/2001 | Rechichi | 106/801 |
| 7,407,615 B2 | 8/2008 | Hohn | |
| 2002/0059886 A1 | 5/2002 | Luo et al. | |

FOREIGN PATENT DOCUMENTS

| | | |
|---|---|---|
| DE | 884 088 | 7/1953 |
| DE | 21 35 877 | 2/1973 |
| DE | 36 32 394 | 3/1988 |
| DE | 195 26 541 | 3/1996 |
| DE | 197 04 198 | 8/1998 |
| DE | 199 14 280 | 9/2000 |
| DE | 100 50 134 | 4/2001 |
| EP | 0 016 727 | 10/1980 |
| EP | 0 735 162 | 10/1996 |
| GB | 557 777 | 12/1943 |
| GB | 2 349 665 | 11/2000 |
| JP | 54 025925 | 2/1979 |
| WO | WO 97 09492 | 3/1997 |
| WO | WO 01 38661 | 5/2001 |
| WO | WO 02 06182 | 1/2002 |
| WO | WO 02/12145 | 2/2002 |

OTHER PUBLICATIONS

International Search Report for PCT/CH02/00583 dated Aug. 25, 2003.

* cited by examiner

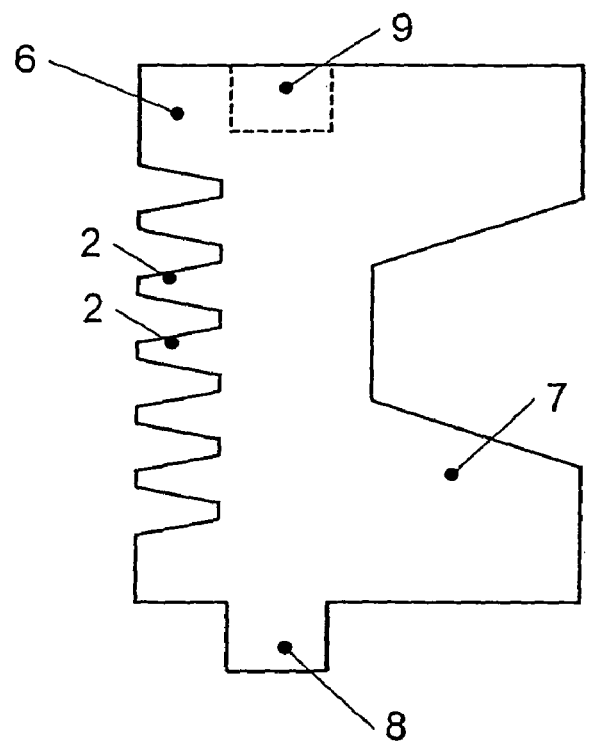
Fig. 2.2
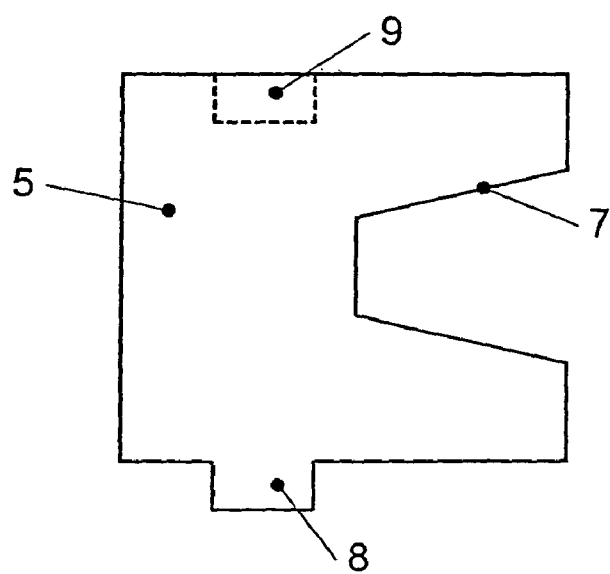
Fig. 2.1

METHOD FOR THE PRODUCTION OF A PLANT-BASED CONSTRUCTION MATERIAL AND CONSTRUCTION MATERIAL OBTAINED BY MEANS OF SAID METHOD

CROSS REFERENCE TO RELATED APPLICATION

The present application is a 35 U.S.C. §§371 national phase conversion of PCT/CH2002/000583 filed 28 Oct. 2002. The PCT International Application was published in the German language.

BACKGROUND OF THE INVENTION

The invention refers to a plant-based construction material. The invention further refers to said plant-based construction material and objects that are produced from this construction material.

Many construction materials produced from renewable primary products have been developed and applied in order to satisfy the need for an ecological construction method in accordance with nature. Various combinations on the basis of vegetable raw materials are known in the art.

Straw and clay are historical ecological construction materials that have been used very frequently. However, their application is restricted by the limited stability and durability of this material combination. Thus, timber framing infills made of straw and clay do not meet today's modern requirements with respect to thermal and acoustic insulation.

Furthermore, various attempts have been made to use wood as a vegetable raw material in combination with cement as a sustainable construction material. However, the low strength resp. surface strength and the excessive density and therefore relatively high weight of the resulting components are often problematic. Also, the noise and heat insulating properties are relatively poor due to the high proportion of cement required as a binder.

In the search for a construction material having a maximum content of renewable primary material and good chemical, physical and mechanical properties, tests have also been made with miscantus (China reed). Due to its high silicon content, inter alia, this plant genus offers ideal properties for processing into a stable and durable construction material.

However, the production of a viable construction material on the basis of a vegetable aggregate is only possible if the latter is bonded in the binder matrix. This condition is fulfilled by a mineralization of the vegetable raw materials. Therefore, a qualitative utilization of renewable vegetable raw materials for modern, contemporary constructions is subject to the quality and efficiency of this mineralization in particular.

Furthermore, as is generally known, constructions require the use of different structural components and elements having specific properties according to the intended application. Thus, besides the components for the construction e.g. of walls, there are other elements such as prefabricated plasterboards.

Accordingly, the problem is to produce a universally applicable plant-based construction material, i.e. a construction material that is suitable for virtually all conceivable applications due to a basic composition that is adaptable in view of the intended application and thus of the required properties and, as the case may be, supplementable by specific, also application-oriented additives.

According to the disclosure of EP-1,108,696 A1, a premineralization of renewable fibrous raw material particles such as wood, hemp, and/or reed particles is achieved by means of cement, preferably Portland cement as a mineralizer. Here, the premineralization of the vegetable raw materials is accomplished in a separate process step, after which the raw materials treated with the mineralization liquid are dried. The pretreated plant parts may then be used for producing concrete or mortars. The drawback of this approach is that an additional treatment of the vegetable raw materials for the purpose of premineralization is necessary. An additional process step is also associated to additional costs, and the construction industry is forced to save additional process steps due to the constant cost pressure. Increased costs for ecological construction methods strongly reduce the attractiveness of such methods and cannot bring about to the application of such alternative plant-based construction materials instead of conventional construction materials.

Therefore, according to WO-A-02/12145, a premineralization of the vegetable aggregate is omitted in order to make the production of concrete and mortars cheaper and simpler on the basis of this aggregate and still to obtain favorable properties with respect to thermal insulation, acoustic insulation, bending and compression strength. However, particularly with regard to the selected mineralizer, this might not be accomplished optimally. Furthermore, an adaptation of the construction material in view of different required properties is not being mentioned, so that the fields of application are expected to be relatively limited.

It is an object of the present invention to solve the problem set forth above and to overcome the disadvantages of the prior art.

SUMMARY OF THE INVENTION

According to the invention, this object is attained by the construction material described below.

Particularly in comparison with the known construction materials of the same category, the construction materials produced according to the method of the invention distinguish themselves by a substantially better bonding ability and by adapted mechanical properties. Furthermore they are inexpensive and ecological due to the application of renewable primary materials and the reduced number of process steps—while a much simpler and less expensive design of the production facilities may be provided and an almost continuous production of the construction material of the invention is possible since an intermediate storage or even an intermediary drying of the mineralized vegetable raw materials is not necessary—and on the logistic level. Ultimately, the possible applications and fields of application of the construction materials of the invention are virtually inexhaustible.

Further details, characteristic features and advantages of the method of the invention and of the construction materials produced therewith will be apparent from the following description of exemplary embodiments. For purposes of illustration, structural elements are described with reference to the following drawings:

BRIEF DESCRIPTION OF THE DRAWINGS

For purposes of illustration, structural elements are described with reference to the following drawings.

DESCRIPTION OF PREFERRED EMBODIMENTS

Figure 1:
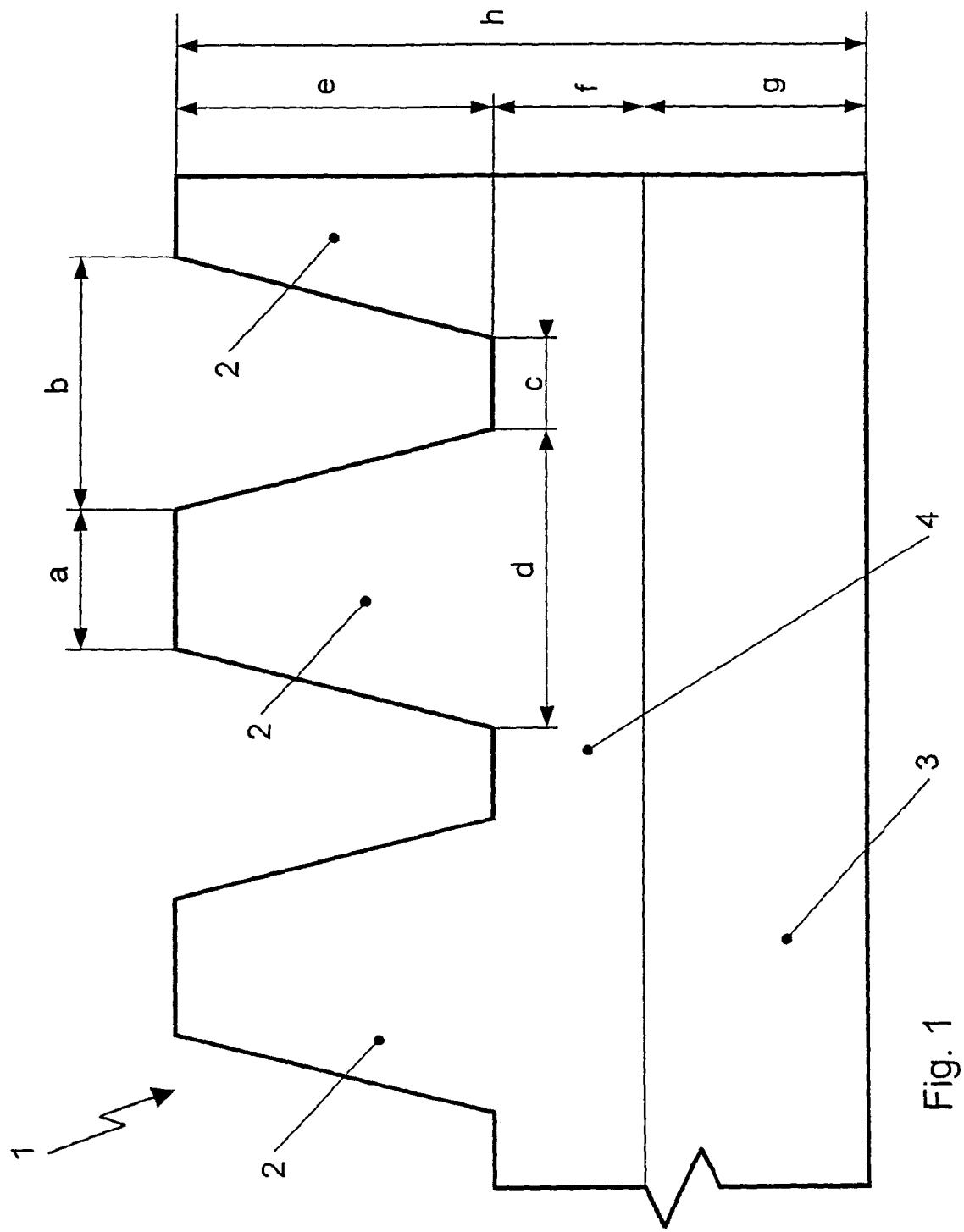
FIG. 1 shows a sound-absorbing structural element,
 FIG. 2.1 shows a slope reinforcement block,
 FIG. 2.2 shows a finned slope reinforcement block.

Miscantus (China reed), hemp shives, hemp fibers, softwood, sugar cane, straw (e.g. wheat or rye straw), switchgrass (panicum virgatum), Italian ryegrass, reed are advantageously used as vegetable raw materials individually or in different combinations. The vegetable raw materials are comminuted prior to use. Depending on the kind of raw material and on the kind of the desired construction material and the structural elements that are to be produced therefrom, they are comminuted into elongate particles of up to approx. 40 mm or into granules of up to approx. 8 mm in diameter. Thus, for example, the desired fiber length may range up to approx. 40 mm and the particle size comprised between 0 and 8 mm if the construction material is to be used for the production of external walls or building bricks whereas these values should preferably range up to 2 mm if the construction material is intended for plastering.

A mixture M1 is admixed to the selected and comminuted plant basis PB of vegetable raw materials in a single process step. Said mixture M1 is composed of a binder, for example Portland cement or a mixture of different Portland cements, but preferably Portland cement of strength class PZ 52.5, and of a mineralizer. The mineralizer is directly admixed to the Portland cement at the Portland cement works according to a recipe, i.e. in predefined, application-oriented resp.-dependent proportions. Thus, the mixture M1 is subsequently taken from a single silo and weighed by means of a scale before being supplied to a mixer in which PB and M1 are blended. As compared to the conventional methods [where the mixer for the mixture {PB+M1} is connected to two silos (one of which contains the Portland cement and the other the mineralizer) through respective scales], this procedure results in a substantial reduction of the production costs of the construction material due to the simplification of the installation and the reduction of the number of process steps.

The weight proportions of the components constituting the mixture M1 are comprised in a range of approx. 50% to approx. 90%, preferably between 6/10 and 4/5, for the Portland cement and in a range of approx. 10% to approx. 50%, preferably between 1/5 and 4/10, for the mineralizer.

The mineralizer is composed of a defined, application-oriented resp.-dependent mixture M2 of calcium carbonate $CaCO_3$ and magnesium carbonate $MgCO_3$, the weight proportions being comprised in a range of approx. 60% to approx. 95%, preferably between 2/3 and 9/10, for $CaCO_3$ and in a range of approx. 5% to approx. 40%, preferably between 1/10 and 1/3, for $MgCO_3$. The practical applications have shown that this composition of the mineralizer ensures a substantially better bonding ability of the vegetable raw materials and therefore a better bond in the matrix than the mineralizers of the prior art.

The mixture obtained from mixtures PB and M1 can now be mixed into a predetermined quantity of mixing water that corresponds to a desired consistency $K_i$ ($K_i$=stiffness of the fresh concrete; $K_1$=moister than earth-moist; loose when shaken; $K_2$=just soft, cloddy when shaken; $K_3$=soft to liquid; source: Lüger).

A number of advantages are noted due to the above-defined composition and its interaction. Thus, it could be observed that the solidification begins after a very short time already, namely approx. 75 minutes after tempering, and that the setting process is accelerated. Furthermore, as compared to all known construction materials, including plant-based construction materials, the volume weight is reduced, bulk porosity is higher, steam diffusion and thermal insulation are improved, and the properties with regard to compression strength, tensile strength, and bending strength values—which are significantly superior to the DIN prescriptions for concrete and mortars—are substantially increased.

The mixture {PB+M1} represents an all-purpose basic mixture, so to speak, thereby allowing multiple and advantageous applications. As the case may be, it may be sufficient just to adapt the proportions of the mixture components M1 (=binder+mineralizer M2) and/or M2 (=calcium carbonate+magnesium carbonate) for a given PB volume. These adaptations are easily performed by those skilled in the art in accordance with the application of the construction material, i.e. the required properties of the construction material.

Another mixture M3 that will be discussed in more detail hereinafter may be admixed to the all-purpose basic mixture. The specialist will of course take this mixture into account in the mentioned adaptation.

Furthermore it has been found that the beginning of the solidification and the following setting process may be substantially delayed by sporadically appearing fungus formation. In this connection, the following fungi are cited on the basis of an analysis performed at the Humboldt University in Berlin: "Alternia" (blue coloration), "Fusarium" (red coloration) and "Penicillium" (yellow coloration). It is therefore advantageous to add a fungicidal preparation to the mixing water to make these fungi ineffectual. This may e.g. be achieved by adding 2/3 liters of sodium hydroxide to 1,000 liters of mixing water. Whenever mixing water is mentioned in the present description, it is implied that the water is enriched in this manner.

If the construction material is e.g. intended for the erection of external walls or for the production of building bricks resp. molded concrete bricks or hollow blocks, it is advantageously composed according to the following specifications:

PB=1 $m^3$, preferably miscantus (comminuted according to the above specifications);

M1=300 kg, composed of 75 kg of mineralizer according to M2 and of 225 kg of Portland cement (weight proportions 25% to 75%);

M2=composed of 60 kg of calcium carbonate and of 15 kg of magnesium carbonate (weight proportions 80% to 20%);

mixing water=approx. 300 l.

It has been found that the products obtained from this construction material distinguish themselves by excellent properties with regard to weight, bending strength, tensile strength, compression strength, thermal insulation and acoustic insulation.

In this regard, applications such as e.g. sound-insulating and -absorbing structural elements will now be described for purposes of illustration with reference to FIGS. 1-3.

In order to improve the quality of life along freeways and roads-and to reduce the noise exposure of the residents, sound-absorbing structural elements are connected to form noise barriers. The primary purpose of these structures is to reduce the noise exposure in the areas behind these walls as seen in the direction of the noise source. It is a comprehensible desire of the concerned communities that these structures in particular should be selected according to ecological aspects. Surprisingly it has been found that specifically the production of sound-absorbing walls from preponderantly vegetable raw materials according to the technical teaching of the invention not only takes into account the ecological aspects but that precisely the sound-absorbing properties of the construction material in combination with the geometrical relationships of the sound-insulating structural elements of the invention provide the improved results as compared to the structural elements that are conventionally used for noise barriers.

A sound-absorbing structural element according to an advantageous embodiment of the invention is illustrated in FIG. 1. 85 percent by weight of miscanthus and 15 percent by weight of softwood shavings are used as vegetable raw materials for the element. 300 kg of the mixture M1 are used per cubic meter of the vegetable raw material, and the construction material is subsequently poured into a mold. After setting, the material density of the obtained structural element is comprised between 450 and 600 kg/m$^3$ depending on the particle size and the resulting porosity of the vegetable constituents.

The sound-absorbing structural element is preferably provided with fins 2 to enlarge the sound-absorbing surface area.

These structural elements are e.g. produced with a height of 2.90 m and a length of 4.00 m.

In accordance with a particularly preferred embodiment of the invention, the sound-absorbing structural element is built up of two layers. Thus, it is composed of a supporting layer 3 and of an absorber layer 4. The structural element itself has a thickness h of 25 cm. Supporting layer 3 with a density of 1,250 kg/m$^3$ has a supporting function, whereas absorber layer 4 with a density of 500 kg/m$^3$ mainly serves a sound insulating function. To this end, absorber layer 4 comprises a layer f on which trapezoidal fins 2 are provided. Fins 2 have a height e of 10 cm and a width d of 10 cm at the fin base. They have a width a of 6 cm at the fin head and a distance c of 3 cm between the fin bases. The thickness of layer f amounts to 4 cm in the exemplary embodiment. The total weight of structural element 1, related to the projected surface area, is 205 kg/m$^3$.

According to another embodiment of the sound-absorbing structural element of the invention, the latter is made of a single layer resp. of a single material. Here, the total thickness of the miscantus-softwood-hemp fiber lightweight concrete construction material is h=20 cm. The fin height e is 8 cm, the width of fins 2 at the fin head a=4 cm and the distance between fins 2 at the fin base c=4 cm.

A remarkable fact is that the sound-absorbing structural elements exhibit a very high resistance to road salt. This is important particularly for applications as sound barriers on freeways, which are strongly exposed to spray water containing road salt in the winter.

The sound-absorbing properties have been examined according to methods that are standardized in DIN/EN 20 354, and it has been found that the sound absorption level of the sound-insulating structural elements of the invention is comprised between 0.71 and 0.88 at a frequency of 250 Hz to 5,000 Hz.

The sound-absorbing surface area of the structural elements is advantageously increased by an additional segmentation of fins 2. The thus created pyramidal projections lead to an increase of the sound-absorbing surface area so that 1.96 m$^2$ of sound-absorbing surface area per square meter of projected surface area of the sound-insulating structural elements are obtained.

Furthermore, the plant-based construction material can also be advantageously used for producing slope reinforcement blocks 5. FIG. 2.1 shows such a cuboidal slope reinforcement block 5 for a form-fitting assembly of several slope reinforcement blocks 5. For a form-fitting assembly of several blocks, each slope reinforcement block 5 comprises a tenon 8 and a groove 9. On the side facing the soil, a recess 7 is provided which is filled up by the adjacent soil 12 when the block is used for the formation of a slope reinforcement wall. Recess 7 is furthermore advantageous in that the block is additionally secured by the soil.

According to FIG. 2.2, sound-absorbing fins 2 are provided on the side of slope reinforcement block 6 opposite the soil 12. The block is thus functionally provided with an increased sound absorption, thereby making it preferentially applicable for slope reinforcement walls along freeways or roads.

Figure 3:
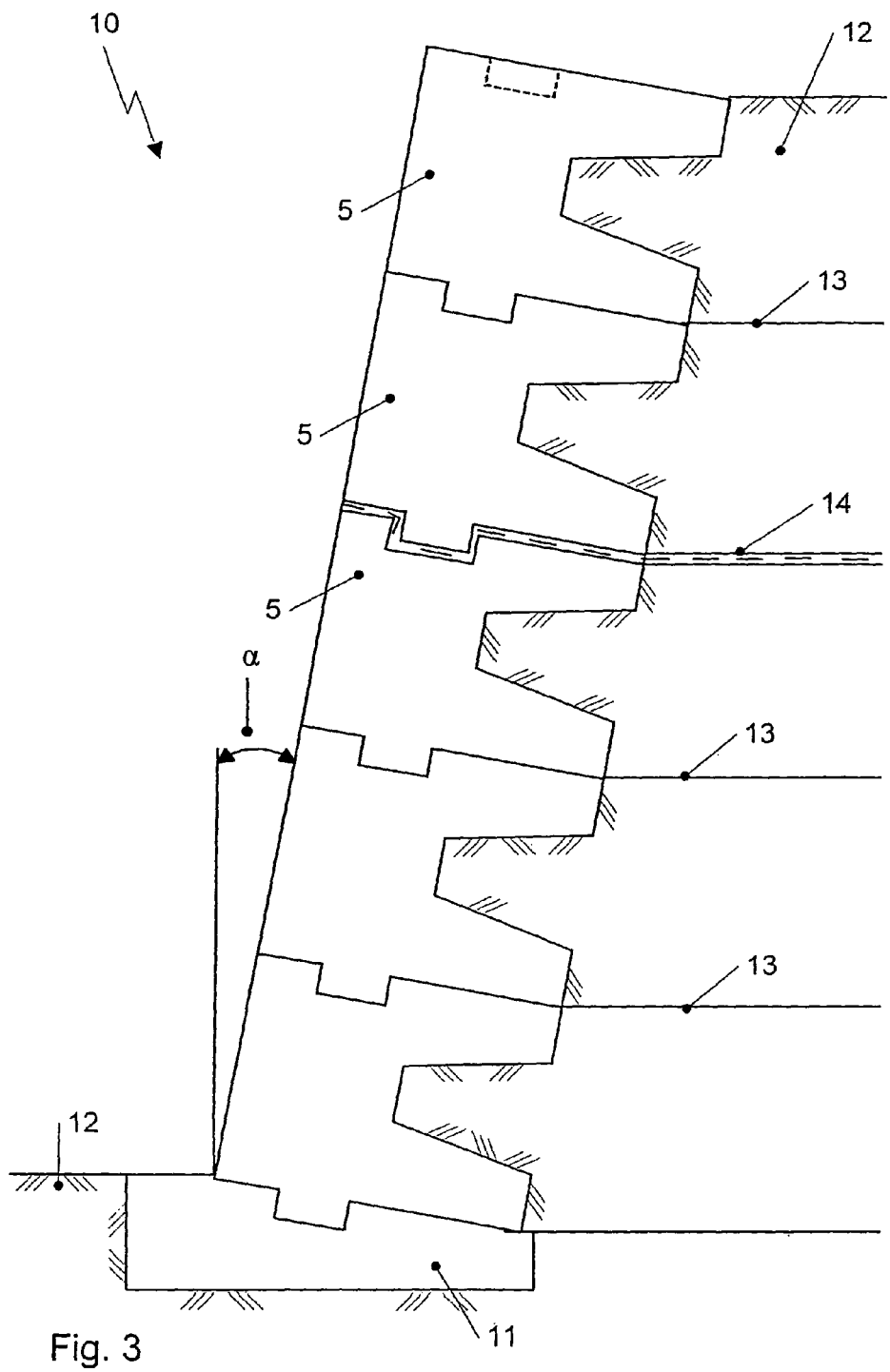
FIG. 3 shows a slope reinforcement wall.

A slope reinforcement wall 10 composed of slope reinforcement blocks 5 is schematically illustrated in FIG. 3. To this end, slope reinforcement blocks 5 are adjoined by a form-fitting introduction of tenons 8 in corresponding grooves 9. In one embodiment of the invention, slope reinforcement wall 10 is inclined at an angle á of approx. 10 degrees with respect to the perpendicular. Further provided is a foundation 11, which essentially absorbs the vertical forces from slope reinforcement wall 10.

Geo fleece mats 13 are interposed horizontally between the layers of the earth. Geo fleece mats designed as tension bands are provided in intervals to absorb the horizontal forces from the slope reinforcement wall.

Furthermore, according to a preferred embodiment of the invention, the construction material of the invention allows to produce structural elements that are even applicable as ceiling elements. To this end, the ceiling elements are reinforced with hemp armoring ropes, the latter having a diameter of 12 mm or more. The spacing of the armoring ropes and the arrangement of the distributors (see below) are determined in accordance with the static requirements.

In one embodiment of the invention for ceiling elements, the armoring ropes are parallelly arranged in the ceiling element at intervals of 10 cm. Furthermore, hemp ropes of a diameter of 8 mm are provided in the ceiling element at intervals of 30 cm as distributors.

In this manner, structural elements having a width of up to 2.5 m and a span of up to 5 m can be realized. It can be proved statically that the application of hemp ropes of a diameter of 12 mm provides a reinforcing effect that is comparable to the application of steel of a diameter of 6 mm (prestress).

Thus, the construction material of the invention allows a large number of applications and products. According to a further embodiment of the invention, a construction material having a high porosity is used as a filling material for a timber framing. In this case, the timber framing fulfills the static function of the structural element while the plant-based construction material provides excellent thermal insulation and noise protection properties. The formulation of a lightweight concrete for wall elements fulfilling an insulating and infill function is indicated as follows:

For 1 m$^3$ of the construction material of the invention,
60% of miscantus chaff
20% of softwood shavings
20% of hemp shives and fibers
240 kg of mixture M1
210 l of water
are directly blended.

Furthermore, the construction material may e.g. be pressed to form a perforated building brick for conventional work. Such a building brick has a width of 30 cm, a height of 24 cm, and a length of 36.5 cm. The volume of the building brick is 26.28 dm$^3$, the hollow spaces with a volume of 7.04 dm$^3$ making up a proportion of 27%. Its weight is 15.50 kg. A composition according to the invention of the vegetable raw materials of the construction material is 75% miscantus shavings and 20% softwood shavings with a hemp fiber proportion of 5% according to the desired static strength.

As indicated above, starting from the mentioned all-purpose basic mixture, the method can be supplemented for producing specific construction materials by adding to this mixture (or, depending on the available equipment, to the mixture M1 or M2) another mixture M3 composed of application-specific materials in application-specific proportions.

For producing e.g. prefabricated quick assembly structural panels, this mixture M3 consists of gypsum, preferably with a starch added. The panels, cut to a conventional size (e.g. length: 2,500 mm, width: 1,250 mm, thickness: 13 mm), are coated on both sides with a special paper made from recovered paper and ready for painting. The construction material forming the core is applied between the paper sheets. This construction material is advantageously composed according to the following specifications:

PB=1 m³, comminution 0 to 2 mm, preferably a mixture of miscantus (85% volumetric content, i.e. 85 kg (specific weight 100 kg/m³)) and of softwood (15% volumetric content, i.e. 16.5 kg (specific weight 110 kg/m³));

M1=160 kg, composed of 60 kg of mineralizer according to M2 and of 100 kg of Portland cement (weight proportions 37.50% to 62.50%);

M2=composed of 42 kg of calcium carbonate and of 18 kg. of magnesium carbonate (weight proportions 70% to 30%);

gypsum=200 kg;

mixing water=approx. 300 kg, remainder=approx. 15%, corresponding to approx. 45 kg.

Thus, a specific weight of approx. 506 kg results. As compared to the conventional plasterboards, which have a specific weight of approx. 650 kg/m³, this represents a significant weight reduction of more than 22%, which is an important advantage particularly with respect to logistics.

Another example of a mixture M3 is a conventional flow agent such as lignine sulfate, polycarboxylate, naphthalene sulfonate or naphthalene acrylate. Indeed, it has been found surprisingly that extruded structural elements can be produced in this manner.

To this end, the construction material is extruded preferably after the addition of flow agents. As compared to the conventional PVC bars (for the manufacture of window profiles, amongst others), the obtained profiles exhibit a higher tensile strength and bending strength.

A structural element having a particularly high tensile strength of the construction material produced in this manner can be produced by using 10 volume percent of hemp or miscantus fibers (or a mixture of these fibers) as a component of the vegetable raw material. The integration of these fibers in the construction material matrix is excellent, and their fiber structure provides outstanding tensile and bending strengths.

Like the plant-based construction materials of the prior art, the construction material described and claimed herein are breathable, recyclable, resource-saving and ecological, and free of toxic substances. However, the latter construction materials distinguish themselves from those of the prior art and a fortiori from the conventional construction materials in that they have a lower volume weight, better chemical, physical, and mechanical properties, and in that they are more economical in manufacture. Not least, it will be noted that the construction materials of the invention cover a virtually inexhaustible range of applications and utilizations.

The invention claimed is:

1. A construction material comprising:
a plant-based component, said plant-based component is added in a volume sufficient to be an aggregate for said construction material,
a mixture M1 of a hydraulic binder and a mineralizer, wherein the proportions of the components constituting the mixture M1 comprise between approximately 50 wt % and approximately 90 wt % of the hydraulic binder and between approximately 10 wt % and approximately 50 wt % of the mineralizer, and the mineralizer is comprised of a mixture M2 of calcium carbonate $CaCO_3$ and magnesium carbonate $MgCO_3$, the proportions of the components constituting the mixture M2 comprise between approximately 60 wt % and approximately 95 wt % of the $CaCO_3$ and between approximately 5 wt % and approximately 40 wt % of the $MgCO_3$.

2. The construction material according to claim 1, wherein the proportions of the components constituting the mixture M1 comprise between 6/10 and 4/5 of the binder and between 1/5 and 4/10 of the mineralizer.

3. The construction material according to claim 1 characterized in that wherein the proportions of the components constituting the mixture M2 comprise between 2/3 and 9/10 of the $CaCO_3$ and between 1/10 and 1/3 of the $MgCO_3$.

4. Construction material according to claim 1, wherein for 1 m³ of plant-based component, the mixture M1 is comprised of 75 kg of mineralizer M2 and of 225 kg of binder in proportion of 25 wt % to 75 wt %, and the mixture M2 of 60 kg of calcium carbonate and of 15 kg of magnesium carbonate in proportions 80 wt % to 20 wt %.

5. The construction material according to claim 1 wherein for 1 m³ of plant-based component, the mixture M1 is comprised of 60 kg of mineralizer according to M2 and of 100 kg of binder in proportions 37.50 wt % to 62.50 wt %, and the mixture M2 of 42 kg of calcium carbonate and of 18 kg of magnesium carbonate in proportions 70 wt % to 30 wt %, and 200 kg of gypsum or mixtures thereof.

6. The construction material according to claim 1, wherein the plant-based component comprises materials comprising miscantus, hemp, softwood, sugar cane, straw, switchgrass or panicum virgatum, Italian ryegrass, reed, the materials being present individually or in different combinations, wherein the materials are comminuted.

7. The construction material according to claim 6, wherein the comminuted particles are elongated particles comprising at least one of fibers of up to approximately 40 mm and a granulate of a grain size up to 8 mm.

8. The construction material according to claim 6, wherein the plant-based component comprises a mixture of miscantus and softwood, with respective volumetric contents of 85% and 15% by volume.

9. The construction material according to claim 6 wherein the plant-based component comprises a mixture of miscantus, softwood, and hemp, with respective volumetric contents of 75%, 20%, and 5% by volume.

10. The construction material according to claim 1, wherein the mixture of plant-based component and the mixture M1 is mixed with a quantity of mixing water to produce a consistency $K_i$ wherein $K_i$ equals the stiffness of the fresh concrete moister than moist earth and loose when shaken.

11. The construction material according to claim 10, wherein for 1 m³ of plant-based component, the quantity of mixing water is approximately 300 liters.

12. The construction material according to claim 11, further comprising a fungicide admixed with the mixing water, by addition of approximately 2/3 liters of sodium hydroxide for 1,000 liters of mixing water.

13. The construction material according to claim 1, wherein the binder is Portland cement of a standardized grade, said standardized grade being strength class 52.5.

14. A method for producing a construction material wherein the construction material comprises a plant-based component, said plant-based component is added in a volume sufficient to be an aggregate for said construction material which contains a mixture M1 of a hydraulic binder and a mineralizer, wherein the proportions of the components constituting the mixture M1 comprise between approximately 50 wt % and approximately 90 wt % of the binder and between approximately 10% and approximately 50% of the mineralizer, and the mineralizer is comprised of a mixture M2 of calcium carbonate $CaCO_3$ and magnesium carbonate $MgCO_3$, the weight proportions of the components constituting the mixture M2 comprise between approximately 60 wt % and approximately 95 wt % of the $CaCO_3$ and between approximately 5 wt % and approximately 40 wt % of the $MgCO_3$ and at least one additional material;

the method comprising:
preparing the mixture M2 comprised of calcium carbonate $CaCO_3$ and magnesium carbonate $MgCO_3$ with the at least one additional material and admixed with the mixture M1 of the binder and the mineralizer in water to a consistency $K_i$.

15. The method for producing a construction material according claim 14, wherein the mixture M2 comprised of calcium carbonate $CaCO_3$ and magnesium carbonate $MgCO_3$, at least one additional material, and the mixture M1 comprised of the binder and the mineralizer is extruded.

16. The method according to claim 14, wherein the preparation of the mixture takes place in a single process step, and the mineralizer and the at least one additional material are previously admixed with the binder.

17. The construction material according to claim 1, further comprising gypsum.

18. The construction material according to claim 17, further comprising starch.

19. The construction material according to claim 18, further comprising a flow agent.

20. The construction material according to claim 5, further comprising starch.

21. The construction material according to claim 20, further comprising a flow agent.

22. The construction material according to claim 1, further comprising a flow agent.

23. The construction material according to claim 5, further comprising a flow agent.

* * * * *